(12) United States Patent
Carducci et al.

(10) Patent No.: US 6,198,881 B1
(45) Date of Patent: Mar. 6, 2001

(54) LOADING METHODS FOR CAMERA FRAME ASSEMBLIES SUBJECT TO STATIC CHARGING DURING FILM SCROLLING

(75) Inventors: Mark S. Carducci; Douglas H. Pearson; Michael E. Hornak, all of Rochester; Jeffrey A. Solomon, Spencerport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/412,226

(22) Filed: Oct. 5, 1999

(51) Int. Cl.[7] .................................................. G03B 17/02
(52) U.S. Cl. ............................ 396/6; 396/277; 396/388
(58) Field of Search ................................ 396/6, 155, 205, 396/277, 388, 429, 661

(56) References Cited

U.S. PATENT DOCUMENTS

| Re. 34,168 | 1/1993 | Ohmura et al. . |
|---|---|---|
| 3,753,389 | 8/1973 | Monks . |
| 3,754,453 | 8/1973 | Ernisse et al. . |
| 4,214,830 | 7/1980 | Schroder . |
| 4,954,858 | 9/1990 | Ohmura et al. . |
| 5,003,330 | 3/1991 | Kotani et al. . |
| 5,337,099 | 8/1994 | Tasaka et al. . |
| 5,410,378 | 4/1995 | Tasaka et al. . |
| 5,574,337 | 11/1996 | Dunsmore . |
| 5,574,555 | 11/1996 | Yamaguchi et al. . |
| 5,634,153 | 5/1997 | Constable . |
| 5,761,541 | 6/1998 | Constable et al. . |
| 5,895,126 | 4/1999 | Watkins et al. . |

FOREIGN PATENT DOCUMENTS

| 5-127318 | 5/1993 | (JP) . |
|---|---|---|
| 6-43592 | 2/1994 | (JP) . |

Primary Examiner—David M. Gray
(74) Attorney, Agent, or Firm—Robert Luke Walker (57) ABSTRACT

In a method for loading a camera frame assembly having an flash circuit powered by a battery, a battery is placed in a battery compartment of a camera frame assembly. Film is scrolled in the camera frame assembly. The scrolling generates a static charge on the camera frame assembly. The static charge is dissipated. During the scrolling and dissipating, the battery is retained within the battery compartment, but is isolated from the flash circuit. Following the dissipating, electrically conductive contact is established between the battery and the flash circuit.

19 Claims, 13 Drawing Sheets

LOADING METHODS FOR CAMERA FRAME ASSEMBLIES SUBJECT TO STATIC CHARGING DURING FILM SCROLLING

CROSS REFERENCE TO RELATED APPLICATIONS

Reference is made to commonly assigned, co-pending U.S. patent application Sr. No. 09/412,934, entitled: CAMERA FRAME ASSEMBLY HAVING STANDBY BATTERY STATION, filed Oct. 5, 1999, in the names of Mark S. Carducci, Douglas H. Pearson, and Michael E. Hornak; Ser. No. 09/412,927, entitled: CAMERA FRAME ASSEMBLY HAVING ACTUABLE BATTERY CONTACT, filed Oct. 5, 1999, in the names of Jeffrey A. Solomon and Mark S. Carducci each of which are assigned to the assignee of this application.

FIELD OF THE INVENTION

The invention relates to film photography and photographic equipment and more particularly relates to loading methods for camera frame assemblies subject to static charging during film scrolling and camera frame assemblies.

BACKGROUND OF THE INVENTION

One-time use cameras are widely available that are sold preloaded with film and a battery or batteries for a flash unit included in the camera. Such cameras are typically made by first assembling a camera frame assembly including a frame, flash unit, battery, and front cover. The camera frame assembly is then tested for proper operation of the flash unit and the camera frame assembly is then moved to a darkroom for film loading. The term "camera frame assembly", as used herein, to refer to both a completed camera and incomplete assemblies, including a frame and one or more other parts, that will be assembled with more parts to form the completed camera. Where necessary to understanding, the state of completion of a camera frame assembly is indicated by context.

The film in these cameras is commonly prewound for winding back into the canister of a film cartridge during use. A variety of different procedures for prewinding the film are known. In some of these, such as procedures disclosed in U.S. Pat. No. 5,895,126, the film is prewound within one of the two film chambers of a camera frame assembly. (This film chamber is also referred to herein as the scrolling chamber.) The film winding is in the dark, with the back of the camera open. The back of the camera is then closed to render the camera light-tight, for example, by attaching a back cover.

The scrolling chamber is part of a plastic camera body member, such as a frame, that is included as part of a camera frame assembly. The support layer of the film is also plastic. The polymers used for the scrolling chamber and the film are dielectrics and are often subject to triboelectric charging when rubbed against each other. As a result, the scrolling chamber, the rest of the camera body member, and the camera frame assembly as a whole can be subject to static electrification, under some ambient conditions, depending upon the polymers used for the scrolling chamber and film, the humidity and other factors. The static charging is temporary and rapidly dissipates, under most conditions, into the surrounding environment.

U.S. Pat. No. 5,574,337 discloses flash devices having a self-oscillating charging circuit employing high feedback gain to maintain oscillations. Static electrification is particularly problematic for cameras having such self-oscillating flash charging circuits. The high feedback gain makes the flash circuit susceptible to electrostatic start up. Since the flash circuits include a flash ready light, electrostatic start up during or immediately after darkroom film winding is likely to result in the flash ready light turning on and the film being fogged.

U.S. Pat. No. 5,634,153 discloses flash devices having a self-oscillating charging circuit in which a resistor can bleed down small amounts of electrostatic charge caused by normal handling of the camera or other device. U.S. Pat. No. 5,761,451 discloses a one-time use camera having a self-oscillating charging circuit having a bleed down resistor, and indicates that during film loading, it is possible for an electrostatic charge to be generated that is too great for the bleed down resistor to bleed down quickly enough to prevent electrostatic starting and resultant darkroom film fogging. U.S. Pat. No. 5,761,451 discloses the use of a shorting wire, during darkroom film loading to short the flash charging circuit and thus prevent electrostatic starting. Holes are provided in a front cover of the camera body to provide access for the shorting wire. U.S. Pat. Re. 34,168 is similar. This approach effectively controls electrostatic starting, but requires careful positioning of a shorting wire or the like through access openings.

U.S. patent application Ser. No. 09/149,688, filed Sep. 8, 1998, discloses a camera flash charging apparatus for a one-time use camera that is subject to starting when a battery is connected to the circuit.

U.S. Pat. No. 5,337,099 discloses a one-time use camera in which an insulating tape is disposed between a battery terminal and battery contact. The tape protrudes through an opening in the camera body and is attached to a wrapper that encloses the camera. When the user tears off the wrapper, the tape pulls out.

It would thus be desirable to provide improved methods for loading a camera frame assembly in which unintended starting of flash charging can be prevented without shorting the flash circuit and despite the presence of a battery.

SUMMARY OF THE INVENTION

The invention is defined by the claims. The invention, in its broader aspects, provides a method for loading a camera frame assembly having an flash circuit powered by a battery, in which a battery is placed in a battery compartment of a camera frame assembly. Film is scrolled in the camera frame assembly. The scrolling generates a static charge on the camera frame assembly. The static charge is dissipated. During the scrolling and dissipating, the battery is retained within the battery compartment, but is isolated from the flash circuit. Following the dissipating, electrically conductive contact is established between the battery and the flash circuit.

It is an advantageous effect of at least some of the embodiments of the invention that improved methods for loading a camera frame assembly are provided in which unintended starting of flash charging can be prevented without shorting the flash circuit and despite the presence of a battery.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
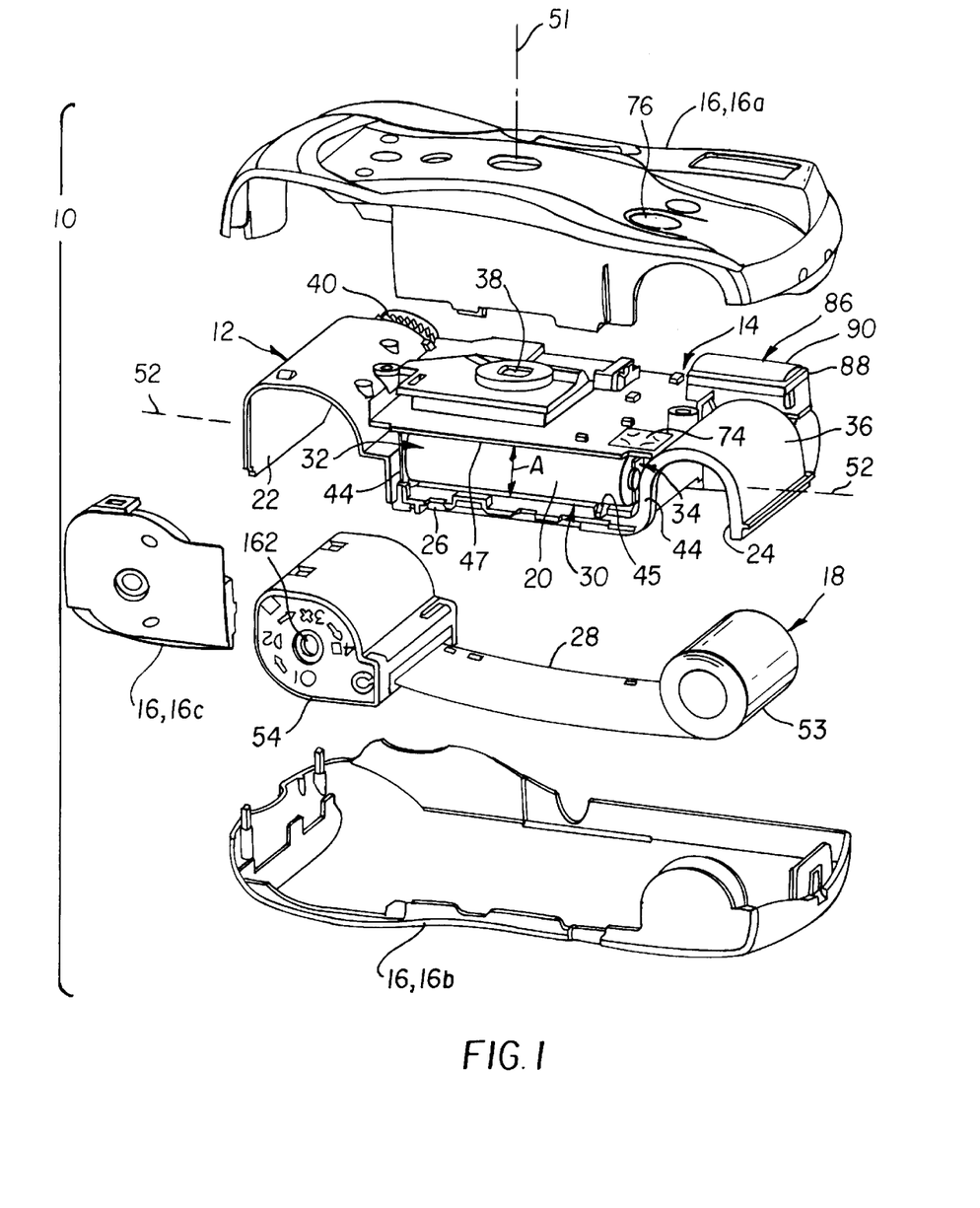
FIG. 1 is an exploded perspective view of an embodiment of the camera frame assembly.

Referring initially, primarily to FIG. 1, a camera frame assembly 10 is shown that is a completed camera. The camera frame assemblies 10 shown in the figures are all for one-time use cameras. The invention is particularly suitable for a one-time use camera, but is also applicable to a reusable camera that is marketed preloaded with a battery 20 or batteries and film 28. The invention is applicable to other cameras and apparatus such as flash units, where static charge build-up can cause inadvertent flash unit charging.

The camera frame assembly 10 has a frame unit 12 and a flash unit 14 mounted on the frame unit 12. When completed as a camera, the camera frame assembly 10 also has one or more cover members 16, a film unit 18, and a battery or batteries 20. In the embodiments shown in the figures, the cover members 16 include three separate pieces: a front cover 16a, a back cover 16b and a removable film door 16c. The cover members 16 come together over the frame unit 12 and are held in place by hooks or other fasteners or sonic welding or adhesives or the like. It is preferred that the frame (discussed below) and cover members 16 are plastic material, such as polystyrene.

The frame unit 12 of the camera frame assembly 10 has a film cartridge chamber 22 and a film roll or scrolling chamber 24. Between the film chambers 22,24 is an intermediate section 26. The intermediate section 26 frames an exposure opening 48 (not shown) and admits light to frames of film 28. The film chambers 22,24 and intermediate section 26 form a light-tight zone for the film 28. The frame unit 12 also has a battery compartment 30 that is joined to the scrolling chamber 24. The battery compartment 30 has opposed near and far ends 32,34. (The invention is generally described herein in terms of particular features be present at the "near end 32" and other features being present at the "far end 34". The embodiments shown and described herein can be modified to interchange the names and attendant features of the two ends.) It is preferred, to reduce the number of critical tolerances, that the battery compartment 30 is exterior to the light-tight zone. The relative position of the battery compartment 30 in the frame unit 12 is not critical. In the embodiments shown in the figures, the battery compartment 30 extends horizontally between the film chambers 22,24 at the bottom, middle of the frame unit 12. The battery compartment 30 can also, for example, be oriented vertically, and can be located on top or at an end of the frame unit 12.

In the embodiment shown in FIG. 1, the frame unit 12 has a frame 36 that is a one-piece plastic casting. Attached to the frame 36 are taking lens system 38, film transport 40, and shutter system 42 (shown in FIG. 2). The frame 36 includes the film chambers 22,24 and the intermediate section 26 and also includes end walls 44 and two adjoining side walls 45,46 (side wall 46 is best seen in FIG. 3) of the battery compartment 30. The end walls 44 are each part of a respective film chamber 22 or 24 and the two side walls 45,46 are parts of the intermediate section 26. A third side wall 47 is provided by part of the flash unit 14. The third side wall 47 can, alternatively, be provided by the frame 36 itself or an attached cover member 16 of other attached component. Opposite the third side wall 47 is a battery compartment opening 48 (indicated in FIG. 3), which is bordered by the first and second side walls 45,46 and the end walls 44.

The walls 44,45,46,47 of the battery compartment 30 delimit a battery space. The two opposed side walls 45,47 restrict motion of the battery 20 in directions parallel to the optical axis 51. The opposed side walls 45,47 are configured to closely receive a battery 20 having a predetermined size and shape. In the embodiments illustrated, the battery 20 is cylindrical and the opposed side walls 45,46 are separated by a dimension ("A" in FIG. 1) that is slightly larger than the diameter of the battery 20. The third side wall 47 limits motion in a direction perpendicular to both the optical axis 51 and a longitudinal axis 52 of the battery 20. The third side wall 47 is separated from the opening 48 by a depth dimension ("B" in FIGS. 3A and 3B) that exceeds the separation "A" of the two opposed side walls 45,46. The depth dimension "B" is preferably less than twice the diameter of the battery 20.

Within the constraints imposed by other camera requirements, the walls 44,45,46,47 can be continuous or discontinuous and regular or irregular in shape, as long as the battery 20 is held within the battery compartment 30. The end walls 44 do not themselves restrict motion of the battery 20 and thus are not critical. For example, depending upon the relative location of the battery 20, end walls 44 can be provided by one or more cover members 16 rather than the frame 36.

The film 28 is moved, between the chambers, by the film transport 40. If the camera frame assembly 10 is for a one-time use camera, it is preferred that the film 28 is prewound and that the film transport 40 consists of an advance mechanism that returns film 28 during usage, on a frame-by-frame basis, from a roll 53 to the canister 54 of a film cartridge or other film unit 18. In this case, the film transport 40 cannot wind film 28 out of the canister 54. The film transport 40 can, alternatively, include a rewind mechanism (not shown). The film 28 is also not limited to the single chamber cartridge shown in the figures. The film 28 can be provided in a two chamber canister 54, such as Type 110 film, or can be provided without a canister 54 and with backing paper, as in Type 120 film, or without backing paper, as in Type 220 film.

Figure 1A:
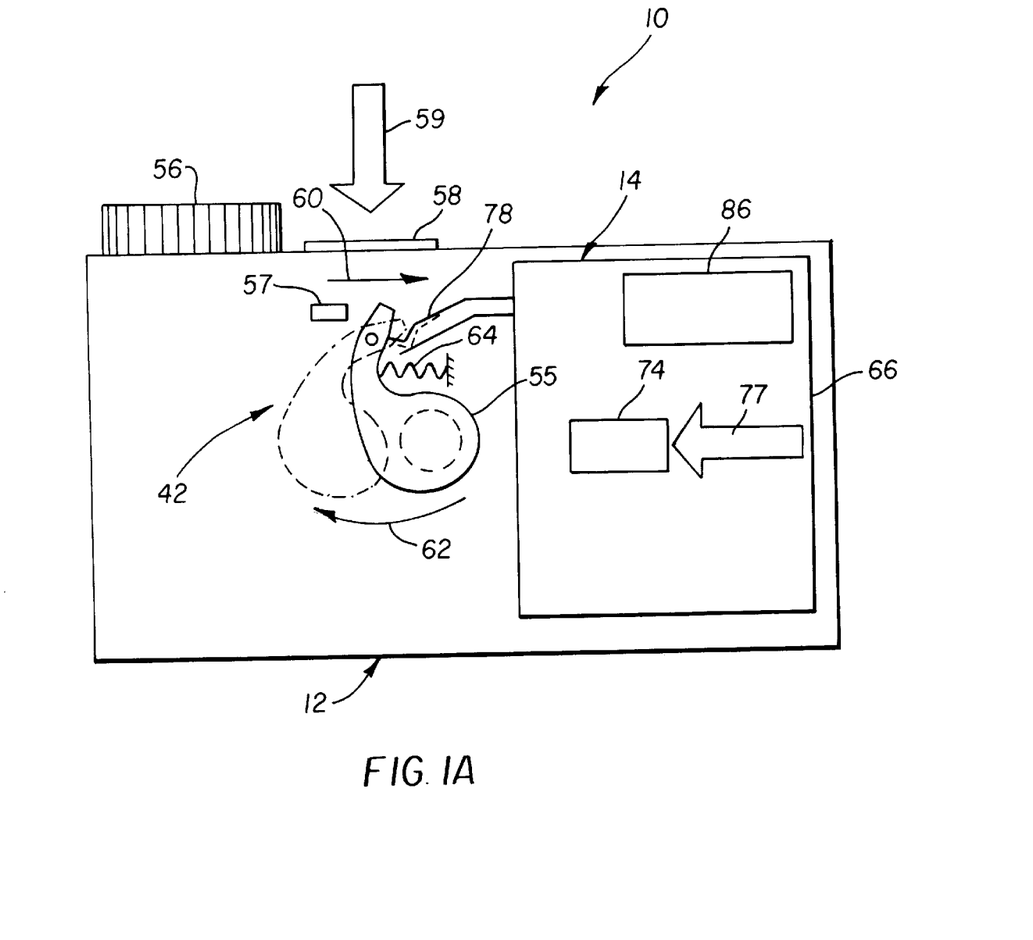
FIG. 1A is a diagrammatical view of the camera frame assembly of FIG. 1 illustrating the frame, flash unit, and shutter system. The location of the aperture is indicated by a dashed line. The shutter is shown in a closed position in solid lines and in an open position in dashed lines.

The light is admitted to frames of film 28, through the taking lens system 38, by means of the shutter system 42. Specific features of the taking lens system 38 and shutter system 42 are not critical to the invention. FIG. 1A illustrates an example of a suitable shutter system 42, which has an impact driven, single leaf shutter 55. When film 28 is transported by rotation of a film advance 56 (illustrated as a winding knob), a high energy lever 57 is charged and film 28 is metered. (Suitable mechanisms for this purpose are well known to those of skill in the art.) When a shutter button 58 is depressed (indicated by arrow 59), the high energy lever 57 is released and travels in the direction of arrow 60. The shutter 55 opens in the direction of arrow 62 to the position indicated in FIG. 1A by dashed lines and then returns to the closed position, indicated by solid lines, due to the biasing of spring 64.

Figure 14:
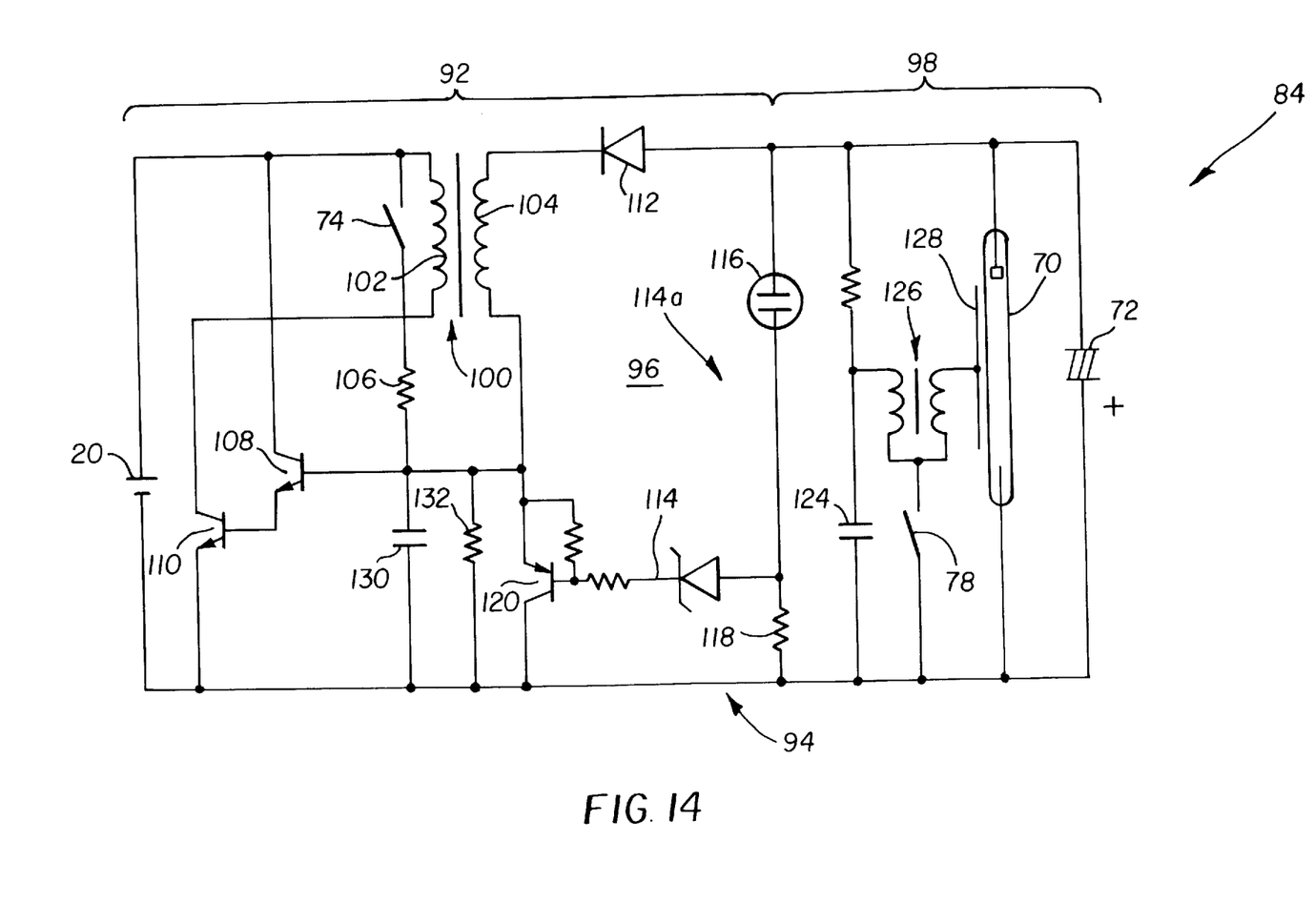
FIG. 14 is a schematic diagram of the flash circuit and battery of an embodiment of the camera frame assembly.

Referring now primarily to FIGS. 1, 1A, and 14, the flash unit 14 has a circuit board 66 having a printed circuit and mounted circuit elements. The circuit elements include a flash tube 70 and a flash capacitor 72 that discharges through the flash tube 70. The circuit elements also include a momentary switch 74 that is aligned with a movable pad 76 formed as part of the front cover 16a. Depression (indicated by arrow 77 in FIG. 1A) of the pad 76 against the switch 74 actuates the switch 74 and initiates charging. The circuit elements include a synchronizing switch 78 that is momentarily closed by the movement of the shutter 55 from the closed position to the open position, as shown in FIG. 1A. The flash unit 14 also has a pair of battery contacts 80,82 that are electrically coupled to the flash circuit 84. (The term "flash circuit 84" is used here in a conventional sense, except that the "flash circuit" is not inclusive of the battery 20.)

The flash tube 70 is mounted in a flash head 86 that also includes a reflector 88 and a diffuser 90 mounted on the open end of the reflector 88. The flash tube 70 is preferably substantially cylindrical in shape and positioned so as to extend longitudinally through the reflector 88. The flash tube 70 can be directly mounted to the board 66 or indirectly using a holder (not illustrated). The reflector 88 can be held by the flash tube 70, as shown in FIG. 1, or mounted to the board or the holder. Suitable mountings and holders of various types are known to those of skill in the art.

The flash unit 14 includes a self-oscillating flash charging circuit 92. Suitable flash circuits 84 including a self-oscillating flash charging circuit 92 are known to those of skill in the art. An example of a suitable flash circuit 84 is shown in the electrical schematic of FIG. 14, the flash unit 14 includes a charging and control circuit 94, a self-oscillating flash charging circuit 92, an oscillation arresting circuit 96, and a flash trigger circuit 98. The charging and control circuit 94 includes the battery contacts 80,82 and is completed by the battery 20. The flash trigger circuit 98 includes the main flash capacitor 72.

The self-oscillating charging circuit 92 includes a voltage converting transformer 100 having primary and secondary windings 102,104, respectively; the previously referred to momentary switch 74 for initiating oscillations in the flash circuit 84; a resistor 106 placed in series with the momentary switch 74; ganged transistors 108,110 acting as switching elements for supporting and maintaining the oscillations; and a diode 112 for rectifying current induced in the secondary windings 104 of the transformer 100.

Normal charging of the flash unit 14 is initiated by a single depression of the momentary switch 74, thereby establishing current flow through the resistor 106, transistors 108,110, and the primary transformer winding 102. The momentary switch 74 connects the base of the transistor 108 to the battery 20 through the resistor 106. Current flowing from the battery 20 into the base of the transistor 108 is multiplied by a transistor gain of fifty (50) and flows to the base of the transistor 110. The current is multiplied again at the transistor 110, with a gain of two hundred (200), and flows through the collector of transistor 110 and the transistor primary winding 102. As the current flow builds in the primary winding 102, it inductively induces current flow in the secondary winding 104. Current flows out of the secondary winding 104, charging the flash capacitor 72, and into the base of the transistor 108, providing positive feedback which sustains oscillations in the charging circuit 92. Once initiated, the oscillations are self sustaining even after momentary switch 74 is opened.

The oscillation arresting circuit 96 includes a zener diode 114 connected from the junction of neon ready light 116 and resistor 118 to the base of a digital pnp transistor 120. The charge voltage on flash capacitor 72 is sensed by neon ready light 116 which begins conducting at two hundred seventy volts (270 v.), whereupon the voltage drop across the ready light 116 falls to two hundred and twenty volts (220 v.) when it is conducting. The voltage sensor 114a, which includes the ready light 116 and the zener diode 114 in series, begins conducting at about three hundred and thirty volts (330 v.), which also represents a predetermined or full charge desired on flash capacitor 72. When the flash capacitor 72 is fully charged, the zener diode 114 begins to conduct, applying current to the base of the transistor 120, switching the transistor 120 on, and grounding the self-oscillating charging circuit 92. Oscillations in the circuit 48 are thereby arrested, and charging stops.

The flash trigger circuit 98 includes a triggering capacitor 124, a voltage converting transformer 126, a flash triggering electrode 128, and the synchronizing switch 78. The triggering capacitor 124 is charged by current flow through the secondary winding 104 at the same time and in the same manner as the flash capacitor 72. In normal operation, the synchronizing switch 78 is closed by the camera shutter system 42 at the proper time in the exposure sequence, as above discussed. The triggering capacitor 124 discharges through the primary windings of the voltage converting transformer 126, inducing about four thousand volts (4 kv.) in the triggering electrode 128, and ionizing the gas in the flash tube 70. The flash capacitor 72 then discharges through the flash tube 70, exciting the ionized gas and producing sufficient flash illumination. An additional capacitor 130 provides filtering on the base of the transistor 108 to keep the circuit from inadvertently turning on due to undesirable noise, such as the neon ready light 116 turning off or from battery 20 bounce. Typically, the flash charging circuit 92 is off (not oscillating) when a picture is taken and the flash tube 70 is fired. Due to the relatively high gain of the oscillation transistors 70,74, electrical energy from firing of the flash tube 70, fed back to the base of transistor 108 via secondary winding 64, causes transistor 108 to begin conducting. This restarts conduction of transistor 110 thereby restarting the charging operation of the flash charging circuit 92. Because of the high gain sensitivity of the oscillation transistors 70,74, relatively small electrical effects, such as caused by battery 20 bounce resulting from jostling of the camera or electrostatic charge induced when a camera user walks on a dry carpet can cause inadvertent start up of the camera. Capacitor 130 from the base of transistor 108 to ground provides a bypass of electrical impulses resulting from battery 20 bounce. A resistor 132 connected from the base of transistor 108 to ground serves to bleed down any small amounts of electrostatic charge build caused by normal handling of the camera thereby preventing inadvertent restart of the flash charging circuit 92. Resistor 132 is limited to bleeding down small amounts of electrostatic charge. During film 28 loading in the process of camera assembly, electrostatic charge generated can be too great for resistor 132 to bleed down quickly enough to prevent restarting of the flash charging circuit 92.

The battery contacts 80,82 can be directly mounted to the circuit board 66 or can be connected by conductors, as desired. The battery contacts 80,82 provide a conductive path to the rest of the flash circuit and can be made out of conductive material, or alternatively, can be made with a non-conductive support bearing a conductive ribbon or coating (not illustrated). The battery contacts 80,82 are disposed at near and far ends 32,34 of the battery compartment 30 and are designated as "near battery contact 80" and "far battery contact 82" in the same manner as the respective ends 32,34 of the battery compartment 30. The battery contacts 80,82 define an active battery station 134 (shown in FIGS. 3 and 3A in solid lines) within the battery compartment 30. The active battery station 134 has the same configuration as the battery 20 and the battery contacts 80,82 are positioned so as to engage respective terminals 136,138 of the battery 20 in the active battery station 134. It is currently preferred that the battery 20 is cylindrical and has a terminal on each end, such as, battery types "AA" and "AAA". At least one of the battery contacts 80,82 is resiliently biased in an inward direction (in the illustrated embodiments, toward the other battery contact) to restrain the battery 20 within the active battery station 134. It is currently preferred that both battery contacts 80,82 are resilient metal strips.

The invention is generally discussed herein in terms of a camera frame assembly 10 having a single battery 20 coupled to the flash circuit 84. Multiple batteries 20 can also be used. If the batteries are arranged in electrical series, then one of the batteries is treated in the same manner as a single battery 20 and the other battery is treated as just another circuit component. The battery compartment can be enlarged to accommodate the additional battery or batteries or a second compartment can be provided. If multiple batteries are arranged in electrical parallel, then those batteries are treated in the same manner as a single battery.

A battery grip 140 is disposed in the battery compartment 30 exterior to one or both battery contacts 80,82. The battery grip 140 is isolated from the flash circuit 84 and defines a standby battery station 142 (shown in FIGS. 3 and 3A in dashed lines) that has the same dimensions as the active battery station 134, but is outwardly offset at one or both ends. The standby battery station 142 is spaced from the near contact 80 sufficiently to isolate the standby battery station 142 (and a battery 20 in the standby battery station 142) from the near contact 80 and, thus, from the flash circuit 84. (The isolation is provided by an insulator that separates the battery terminal 136 and the near contact 80. Since the battery contacts are in the low voltage part of the flash circuit 84, the insulator can be a small air gap. A convenient minimum dimension is a multiple of a separation necessary to prevent breakdown for a particular battery voltage under expected ambient conditions.

The far battery contact 82 or the battery grip 140 or both are biased inwardly. This biasing restrains the battery 20 within the standby battery station 142. The battery 20 is movable between the standby battery station 142 and the active battery station 134. This movement is preferably, entirely within the battery compartment 30.

In an embodiment illustrated in FIGS. 3A and 5–9, the battery grip 140 is a single abutment 144 and the standby battery station 142 extends between the abutment 144 and the far battery contact 82. The standby battery station 142, thus, fully overlaps the active battery station 134 at the far battery contact 82. A battery 20 in the standby battery station 142 is engaged by the far battery contact 82 and the abutment 144. The abutment 144 is not coupled to the flash circuit 84 and is positioned so as to isolate standby battery station 142, and the respective terminal of a battery 20 in the standby battery station 142, from the near battery contact 80. The standby battery station 142, thus, does not overlap or only partially overlaps the active battery station 134 at the near battery contact 80. The specific position of the abutment 144 is a function of the configuration of the battery stations 134,142, which is largely determined by the size and shape of the battery 20.

Figure 3A:
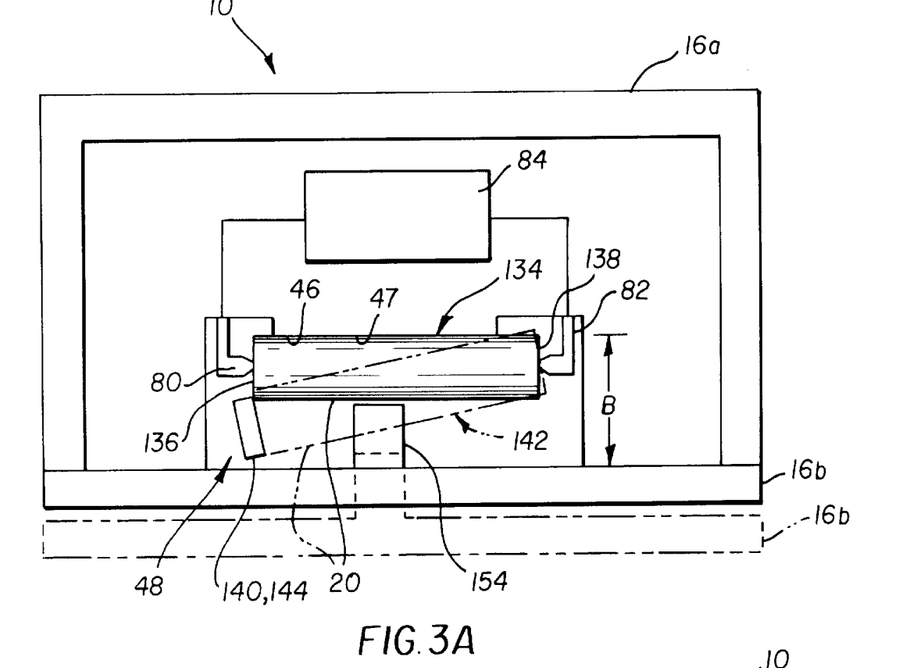
FIG. 3A is a diagrammatical view of the embodiment of the camera frame assembly prepared by the method shown in FIG. 2. The positions of the battery, back cover, and ram at the start of the concurrent establishing and closing steps are indicated by dashed lines.
Figure 3B:
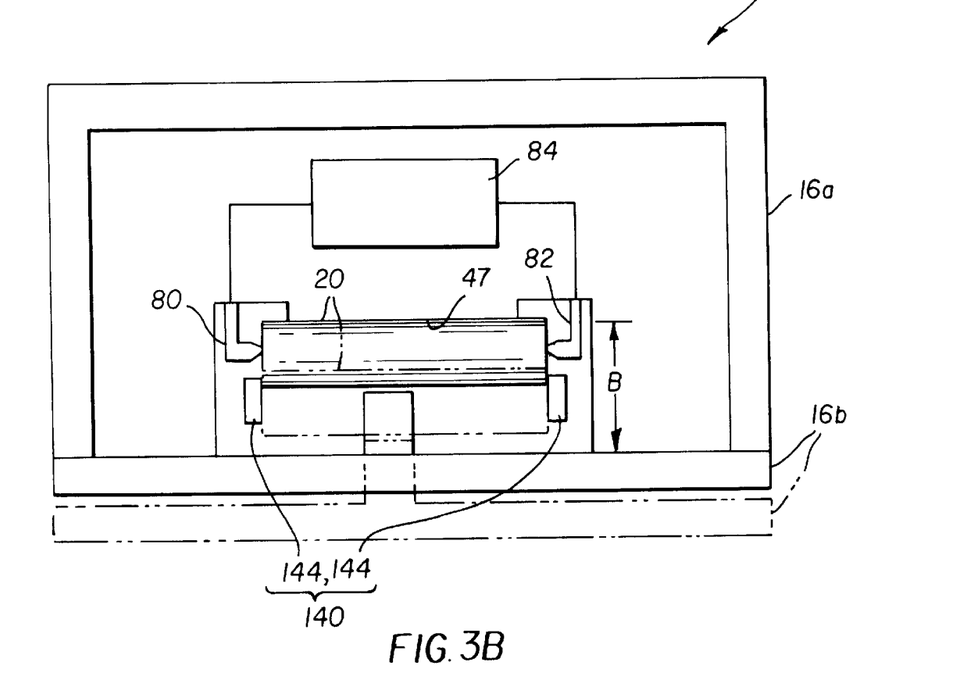
FIG. 3B is the same view as FIG. 3A of another embodiment of the camera frame assembly.

In the embodiment shown in FIG. 3B, the battery grip 140 has a pair of opposed abutments 144 and the standby battery station 142 does not overlap the active battery station 134 at either battery contact 80,82. The standby battery station 142 and active battery station 134 overlap between, and in spaced relation to the battery contacts 80,82. This provides some space savings. The standby battery station 142 and active battery station 134 can instead be fully spaced apart, if desired.

As a matter of convenience, the battery grip 140 is discussed herein, generally in terms of the embodiment of FIGS. 3A and 5–9, in which there is a single abutment 144. It will be understood that like considerations are applicable to other embodiments.

As a further assurance against electrical coupling between the standby battery station 142 and the near battery contact 80, it is preferred that the abutment 144 is made out of insulating material and that the abutment 144 and battery contacts 80,82 are all attached to the frame unit 12 in fixed positions on the frame 36, with movement of the contacts and abutment limited, at most, to flexure. In particular embodiments, the frame 36 and abutment 144 are each polymeric and the abutment 144 is made in one-piece with the frame 36 as a single plastic casting. In these embodiments, the abutment 144 can be made to be flexible relative to the rest of the frame 36 or can be rigid depending upon thickness and the elasticity of the plastic used.

Referring now particularly to FIGS. 5–8A, in a particular embodiment the battery grip 140 has a shoulder surface 146 and an end surface 148 adjoining the shoulder surface 146. The shoulder surface 146 is disposed so as to face inward toward the inner side wall 46 of the battery compartment 30, adjoin the active battery station 134, and be spaced from the standby battery station 142. The end surface 148 is disposed so as to face the far battery contact 82 and far end 82 of the compartment 30, adjoin the standby battery station 142, and be spaced from the active battery station 134. A battery 20 disposed in the standby battery station 142 is engaged by the end surface 148 and the far battery contact 82 and is spaced from the shoulder surface 146. A battery 20 disposed in the active battery station 134 is engaged by the near and far battery contacts 80,82 and laterally restrained by the shoulder surface 146 and is spaced from the end surface 148. In this embodiment, the shoulder surface 146 and a side surface 150 (best seen in FIG. 8B) of a tab 152 disposed in the far end 34 of the compartment, together comprise the side wall 45 of the battery compartment 30 and restrains movement of the battery 20 in the active battery station 134 toward the back of the camera frame assembly 10.

Figure 6:
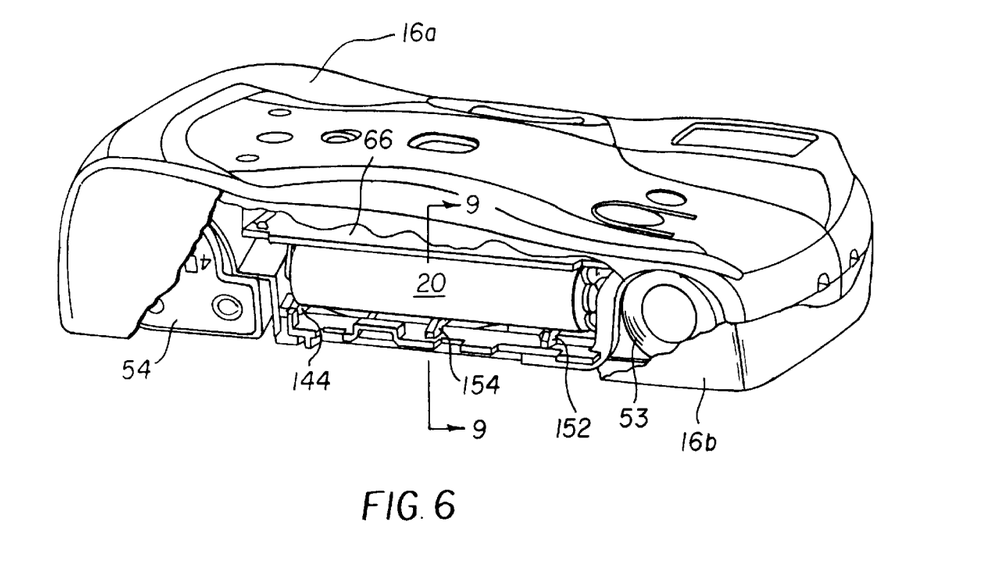
FIG. 6 is a perspective view of the camera frame assembly of FIG. 5 after the establishing of electrically conductive contact between the battery and the flash circuit. The front and back covers are shown partially cut-away.
Figure 7:
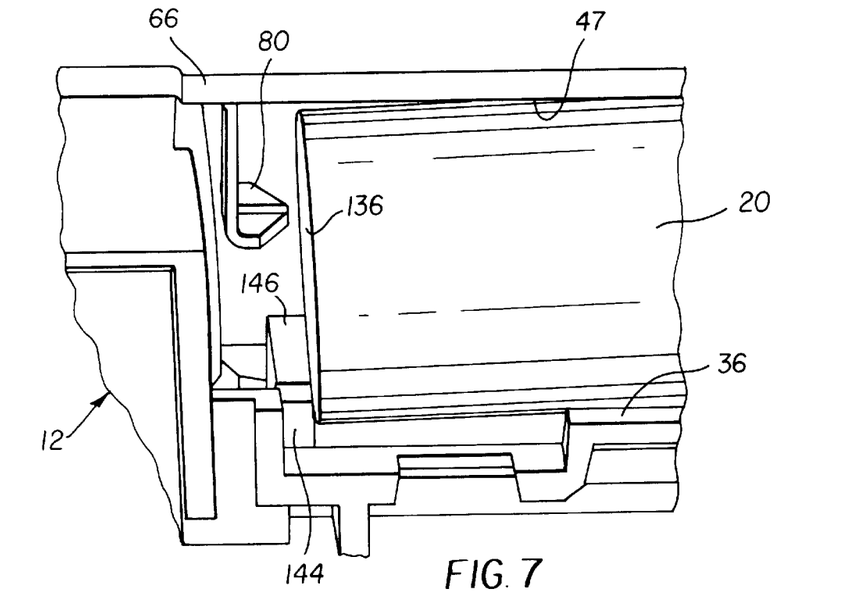
FIG. 7 is a partial enlargement of FIG. 5.
Figure 8A:
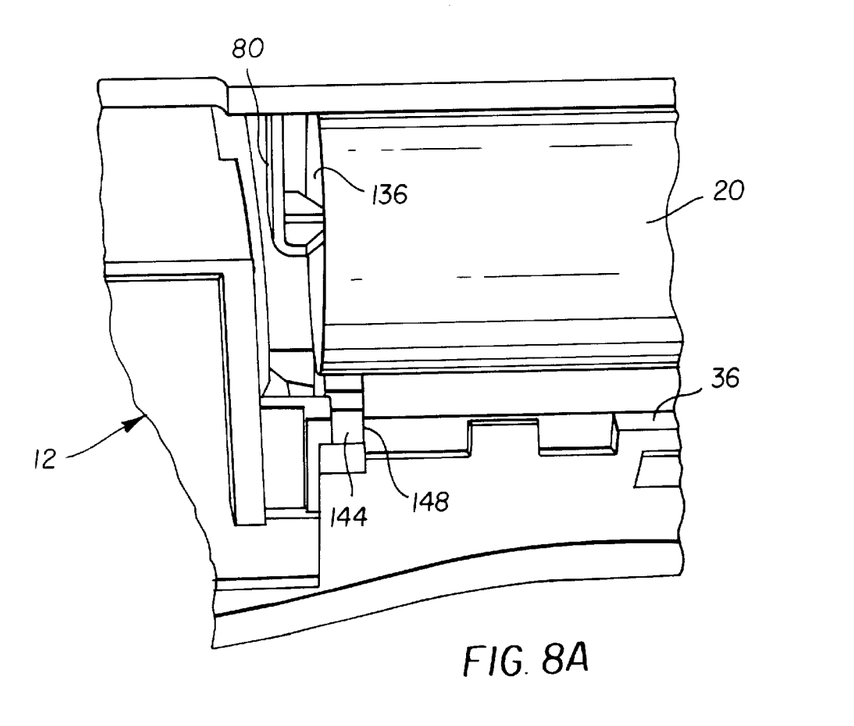
FIG. 8A is a partial enlargement of FIG. 6.
Figure 8B:
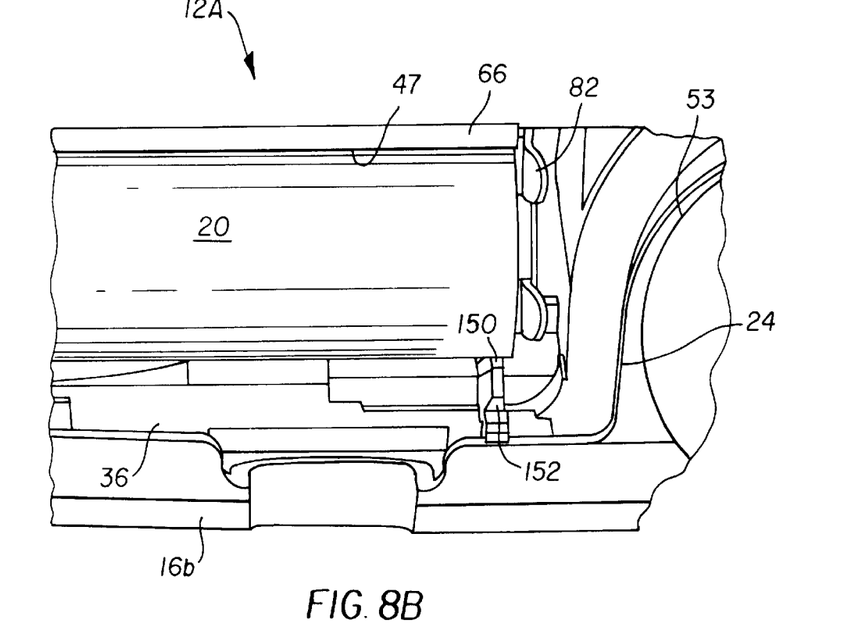
FIG. 8B is another partial enlargement of FIG. 6.
Figure 9:
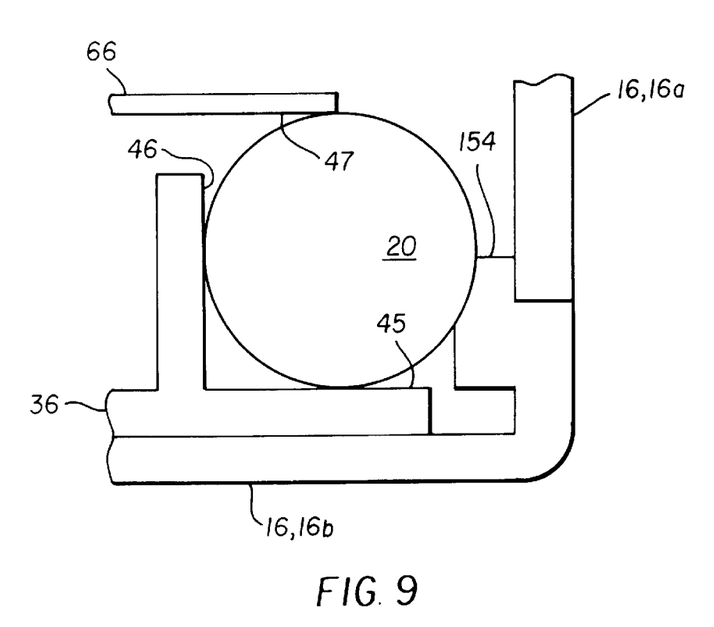
FIG. 9 is a partial cross-section of the camera frame assembly of FIG. 6 taken substantially along line 9—9.
Figure 10:
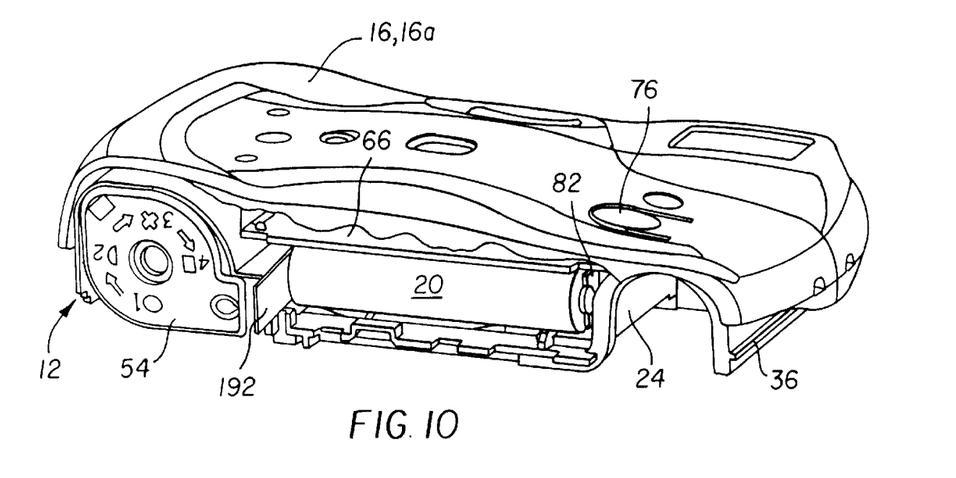
FIG. 10 is a perspective view of the camera frame assembly of FIG. 4 after film cartridge placement, but prior to scrolling. The front cover is shown partially cut-away.
Figure 11:
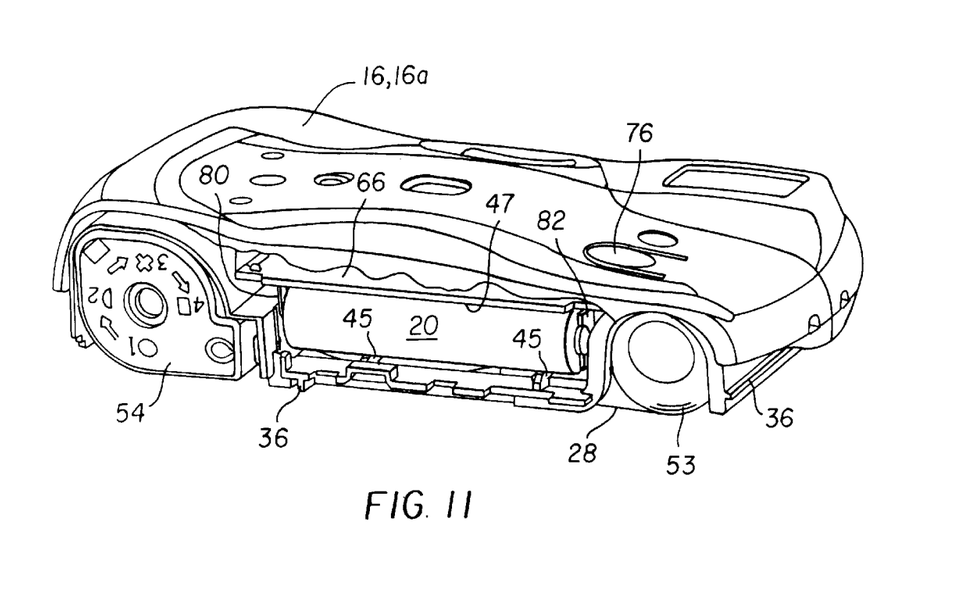
FIG. 11 is a perspective view of the camera frame assembly of FIG. 4 after the establishing of electrically conductive contact between the battery and the flash circuit. The front cover is shown partially cut-away.
Figure 12:
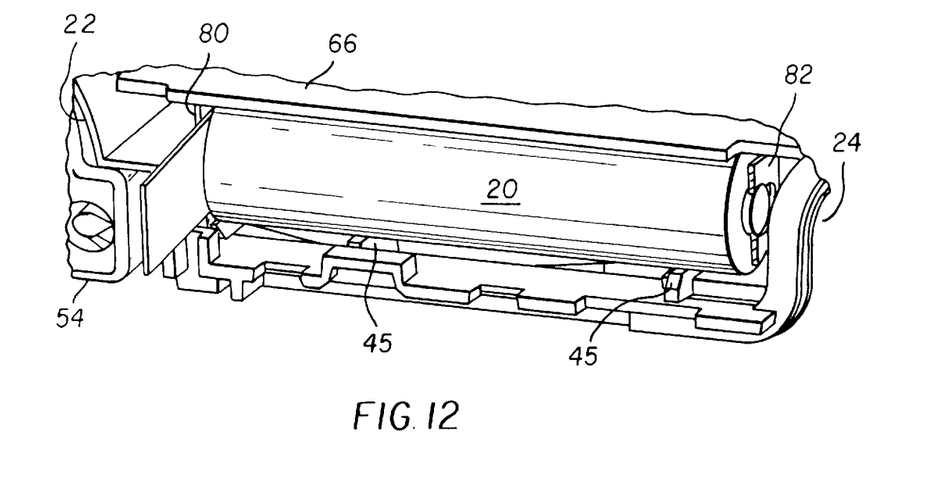
FIG. 12 is a partial enlargement of FIG. 10.
Figure 13:
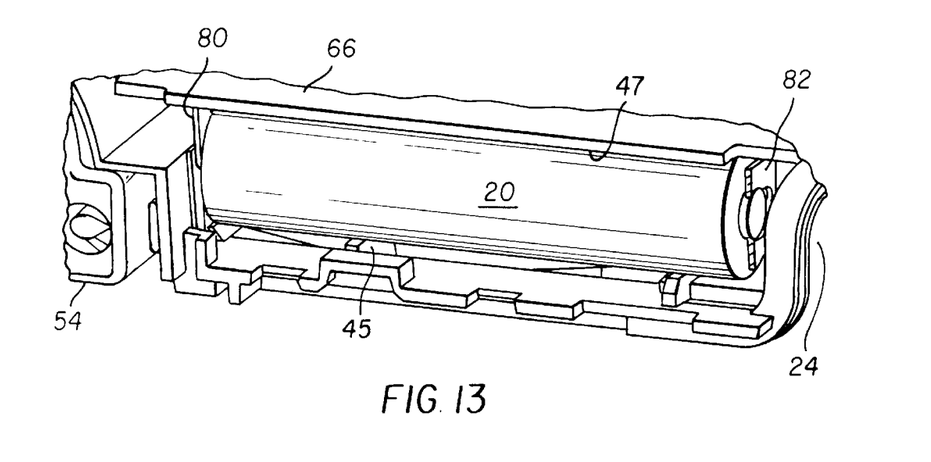
FIG. 13 is a partial enlargement of FIG. 11.

In FIGS. 3A, 3B, and 6 the camera frame assembly 10 includes a back cover 16b that closes the opening 48 of the battery compartment 30. In particular embodiments of the invention, the cover has a ram 154 that is disposed in the standby battery station 142. The ram 154 can be a separate piece, but is preferably part of a one-piece plastic casting that also includes the back cover 16b. The ram 154 is preferably configured so as to adjoin the active battery station 134, so that when the back cover 16b is in place, the ram 154 helps restrain movement of the battery 20 outward from the active battery station 134.

Figure 2:
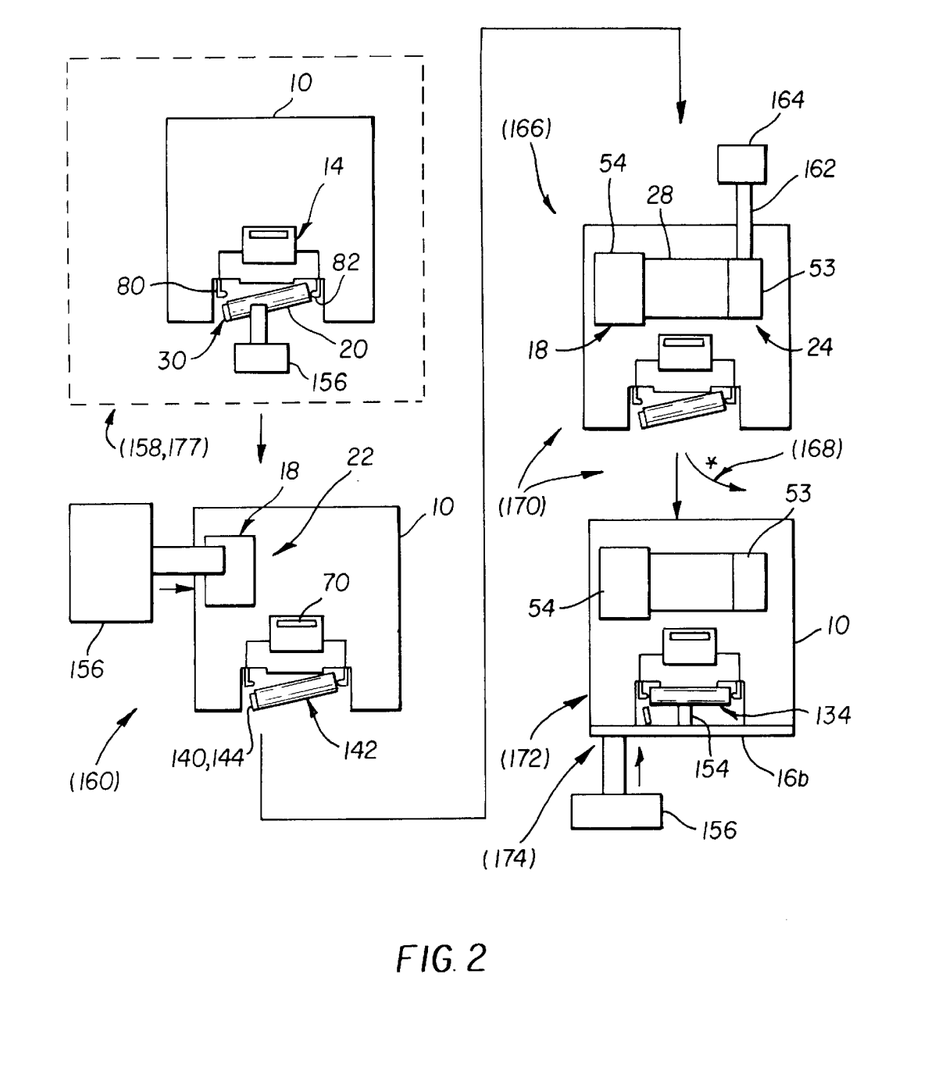
FIG. 2 is diagrammatical view of an embodiment of the method of the invention. A placing procedure is indicated by a dashed box.
Figure 4:
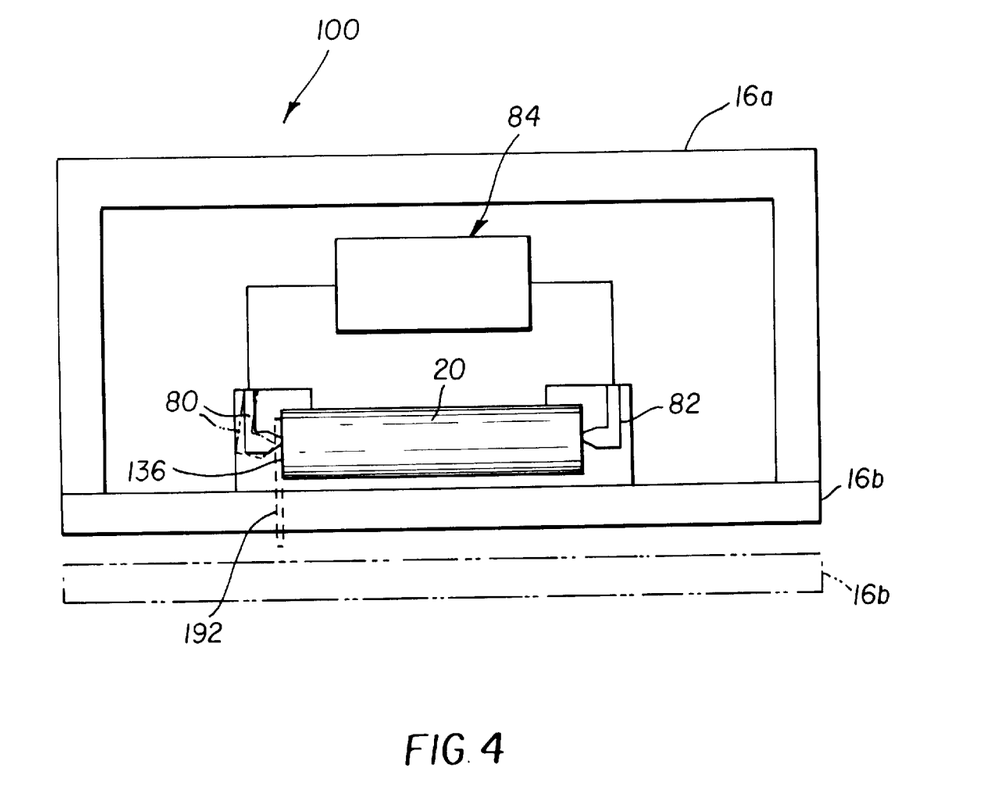
FIG. 4 is the same view as FIG. 3A of still another embodiment of the camera frame assembly. Positions of the spacer and near battery contact when displaced by the spacer, are indicated by dashed lines, as is the position of the rear cover prior to closing of the battery compartment.
Figure 5:
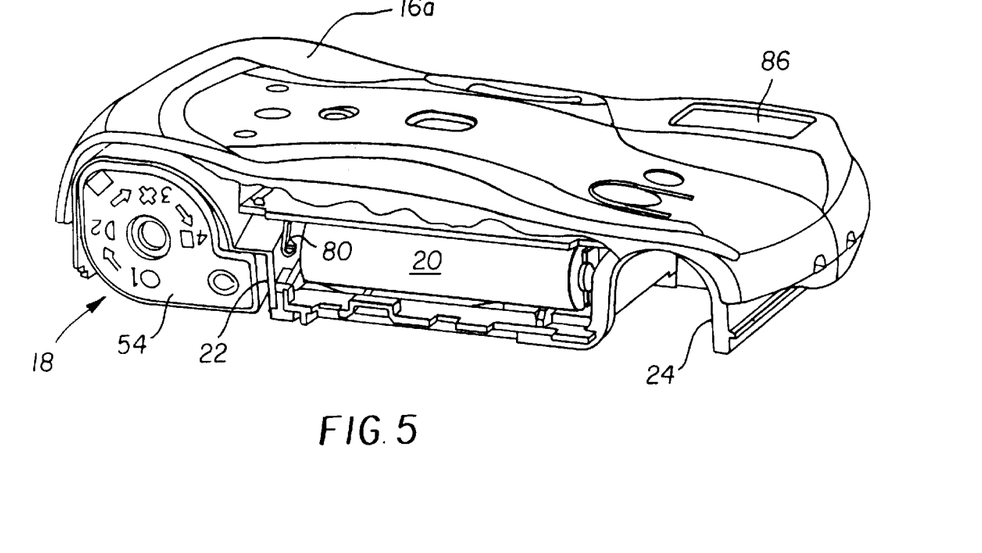
FIG. 5 is a perspective view of the camera frame assembly of FIGS. 2 and 3A after film cartridge placement, but prior to scrolling. The front is shown partially cut-away.

Referring now particularly to FIGS. 2–4, in the method, a battery 20 and film unit 18 are assembled in a camera frame assembly 10. The camera frame assembly 10 has a flash circuit 84 powered by the battery 20. The method can be used with a variety of types of camera frame assembly, but is particularly advantageous for camera frame assemblies 10 having a flash unit 18 with a self oscillating flash charging circuit 92.

Referring now particularly to the embodiment shown in FIG. 2, a battery 20 is placed (158) in the battery compartment 30 of the camera frame assembly 10. This and some other functions are illustrated diagrammatically as being provided by pick-and-place devices or other positioning equipment 156. (This is also the case in FIGS. 2A–2B) The invention is not limited to particular equipment. For example, one or more of the steps could be performed manually or by other automated equipment.

A film unit 18 is placed (160) in the film cartridge chamber 22 of the camera frame assembly 10. The film unit 18 shown in the figures has a canister 54 in which film is in a coil (not shown) about a spool 162 (shown in FIG. 1). After the film unit 18 is placed in the chamber 22, the film 28 is transported out of the canister 54 to the scrolling chamber 24 and is scrolled (166) within the scrolling chamber 24 into a film roll 53. In FIG. 2, the film 28 is illustrated as being wound about a quill 162 driven by a torque-limited automatic screwdriver or like rotary device 164. Other equipment and procedures for film scrolling are well known to those of skill in the art. For example, film could be wound on a spool (not illustrated) driven by the automatic screwdriver or film could be thrust into an empty chamber 24.

The scrolling generates a static charge on the camera frame assembly 10. Before proceeding further, the static charge is dissipated (indicated in FIG. 2 by asterisk and arrow (168)). Static charges dissipate naturally over time unless charge transfer is precluded. The dissipating of the static charge can thus be accomplished by simply waiting while the camera frame assembly 10 is exposed to the ambient atmosphere and contact with support structures. Dissipation rates can be increased by grounding.

During the scrolling and dissipating, the battery 20 in the battery compartment 30 is isolated (170) from the flash circuit, and with camera frame assemblies of the embodiments of FIGS. 3–3A the battery 20 is resiliently retained in the standby battery station. Following the scrolling and dissipating, electrically conductive contact between the battery 20 and the flash circuit is established (172) and the battery is then resiliently retained in the active battery station. The opening 48 of the battery compartment 30 is closed (174) by placing the back cover 16b on the camera frame assembly 10. It is preferred that a ram 154 is present on the back cover 16b, such that, as the back cover 16b is closed, the ram 154 joined to the back cover 16b moves into the standby battery station 142, pushing (176) the battery 20, within the battery compartment 30, from the standby battery station 142 to the active battery station 134 to establish (172) electrical contact. In this case, closing (174) and establishing (172) are concurrent.

Figure 2A:
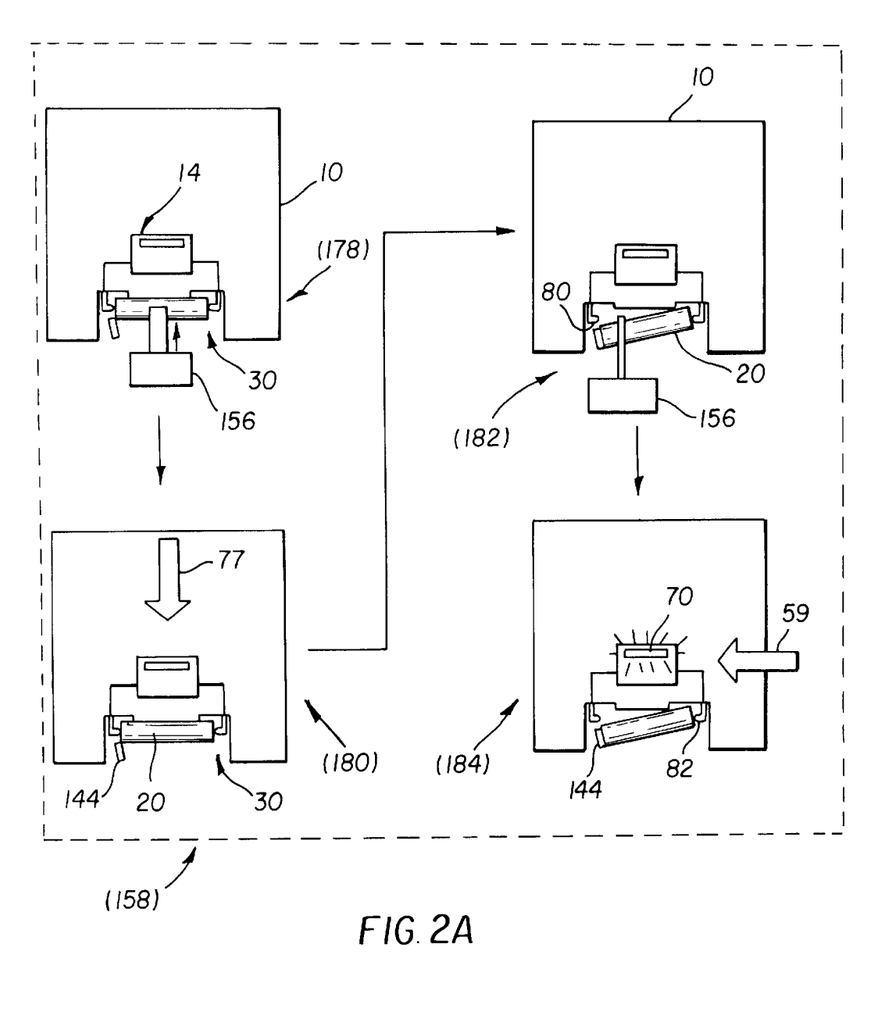
FIG. 2A is a diagrammatical view illustrating a modification of the placing procedure of FIG. 2.

The placing procedure (indicated by a dashed line in FIGS. 2–2B) differs in different embodiments of the method. In FIG. 2 placing is limited to moving the battery 20 into the battery compartment 30 and lodging (177) the battery 20 in the standby battery station 142.

In an alternative placing procedure shown in FIG. 2A, the battery 20 is initially positioned (178) in the battery compartment 30, within the active battery station 134. The momentary switch 74 is then actuated (indicated by arrow 77) to start charging of the flash unit 14. The battery 20 is moved (180), within the battery compartment, from the active battery station 134 to the standby battery station 142, disestablishing (182) electrical coupling between the flash circuit and the battery 20. The flash unit 14 is then test fired (184). This procedure could be modified by firing the flash unit 14 before moving the battery 20 to the standby battery station 142, but the modification is not preferred, since it would present a risk that the flash unit 14 could recharge while the battery 20 was still in the active battery station 134. The test firing of the flash unit 14 can be performed by closing the synchronization switch, without moving the shutter; but it is more efficient if the shutter is tested at the same time by cocking and then actuating the shutter using the shutter release.

Figure 2B:
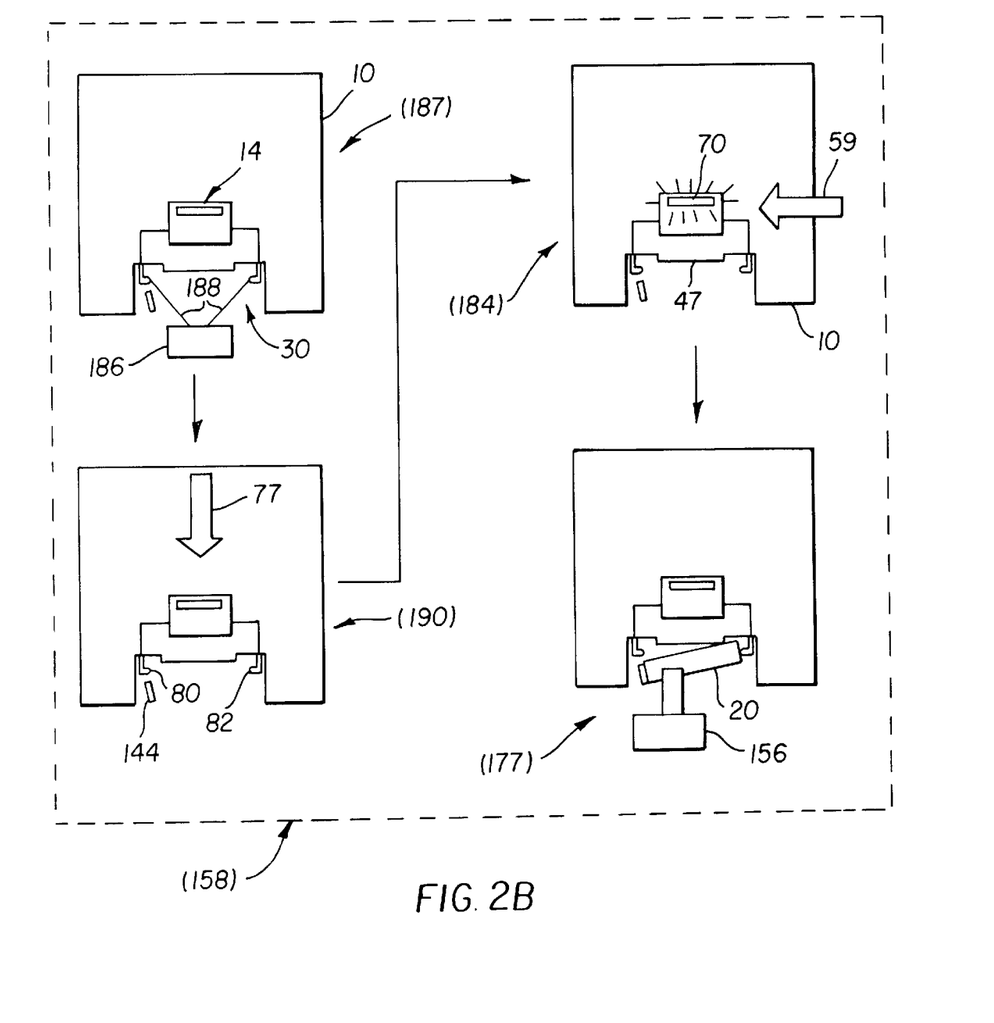
FIG. 2B is a diagrammatical view illustrating another modification of the placing procedure of FIG. 2.

In an alternative placing procedure shown in FIG. 2B, an external power source 186 is initially coupled (187) to the battery contacts 80,82 using conductors 188, in place of the battery 20. The power source 186 is removed (190) the circuit is charged and test fired (184), and the battery 20 is lodged (177) in the standby battery station 142.

At the end of the placing procedure, in the embodiments of FIGS. 2–2B, the battery 20 is in the standby battery station 142, gripped by the far contact 82 and the abutment 144. The battery 20 is isolated from the flash circuit 84, which is not charged.

The methods are described above in relation to the camera frame assembly 10 of FIG. 3A, but are also applicable to the camera frame assembly 10 of FIG. 3B and other embodiments.

Referring now to FIGS. 4 and 10–13, the method can also utilize a camera frame assembly 100 that lacks a battery grip 140. In this case an electrically insulating spacer 192 (best seen in FIG. 12) is positioned between a battery 20 contact and respective terminal, retained in place during scrolling to isolate the battery 20, and is then removed to establish electrical contact between the battery 20 and a resilient near contact 80 of the flash circuit 84. This approach has the advantage of a slightly smaller battery compartment 30, since there is no standby battery station 142 within the battery compartment 30. On the other hand, this approach has the shortcoming that the spacer 192 adds an additional part that is used and discarded (or refused at risk of failure) or a relatively delicate tool that is subject to wear and damage.

The invention has been described in detail with particular reference to certain preferred embodiments thereof, but it will be understood that variations and modifications can be effected within the spirit and scope of the invention.

What is claimed is:

1. A method for loading a camera frame assembly having an flash circuit powered by a battery, said method comprising the steps of:

placing a battery in a battery compartment of a camera frame assembly;

scrolling film in said camera frame assembly, said scrolling generating a static charge on said camera frame assembly;

dissipating said static charge;

during said scrolling and dissipating, isolating said battery in said battery compartment from the flash circuit;

following said dissipating, establishing electrically conductive contact between said battery and said flash circuit.

2. The method of claim 1 further comprising resiliently gripping said battery during said insolating.

3. The method of claim 1 further comprising prior to said scrolling, test firing said flash unit.

4. The method of claim 1 wherein said placing further comprises establishing electrically conductive contact between said battery and said flash circuit, and said method further comprises, prior to said scrolling, disestablishing electrically conductive contact between said battery and said flash circuit and test firing said flash unit.

5. The method of claim 1 wherein said placing further comprises lodging said battery in a first position in said battery compartment and said establishing further comprises moving said battery from said first position to a second position in said battery compartment.

6. The method of claim 5 further comprising resiliently gripping said battery in said first position.

7. The method of claim 1 wherein said battery has a pair of terminals and the circuit has a pair of battery contacts; said insulating further comprises retaining an insulating spacer between one of said terminals and a respective one of said contacts; and said establishing further comprises removing said spacer.

8. The method of claim 1 further comprising closing said battery compartment following said establishing.

9. The method of claim 1 further comprising placing a film cartridge in said camera frame assembly prior to said scrolling, said cartridge having said film within a canister.

10. A method for loading a camera frame assembly comprising the steps of:

installing a battery in a battery compartment of a camera frame assembly, said battery having a pair of terminals, said frame assembly having a flash circuit and a pair of battery contacts joined to said circuit and disposed in said battery compartment;

following said installing, keeping one of said terminals electrically insulated from said contacts;

during said insulating, scrolling film in said frame assembly;

following said scrolling, disposing each of said terminals in electrically conductive relation with respective ones of said contacts.

11. The method of claim 10 wherein said installing further comprises disposing each of said terminals in electrically conductive relation with respective ones of said contacts, and said method further comprises following said installing and prior to said keeping, moving at least one of said terminals out of electrically conductive relation with a respective one of said contacts, and test firing said flash circuit.

12. The method of claim 10 further comprising closing said battery compartment.

13. The method of claim 12 wherein said disposing is concurrent with said closing.

14. The method of claim 10 wherein said keeping further comprises positioning an electrically insulating spacer between one of said contacts and a respective said terminal, and said disposing further comprises removing said spacer.

15. The method of claim 10 wherein said installing further comprises lodging said battery in a first position in said battery compartment and said disposing further comprises lodging said battery in a second position in said battery compartment.

16. The method of claim 15 further comprising closing said battery compartment.

17. The method of claim 16 wherein said disposing is concurrent with said closing.

18. A method for loading a camera frame assembly having an flash circuit, said method comprising the steps of:

installing a battery in a standby battery station of the camera frame assembly;

resiliently retaining said battery in said standby battery station, in electrical isolation from said flash circuit;

scrolling film in said camera frame assembly during said retaining;

following said scrolling, pushing said battery from said standby battery station into an active battery station;

maintaining said battery in said active battery station in electrically conductive contact with said flash circuit.

19. The method of claim 18 further comprising obstructing said standby battery station during said pushing and maintaining.

* * * * *